(12) United States Patent
Awad et al.

(10) Patent No.: US 12,010,046 B2
(45) Date of Patent: Jun. 11, 2024

(54) COMMUNICATIONS DEVICES, INFRASTRUCTURE EQUIPMENT AND METHODS FOR COMMUNICATING VIA AN ACCESS INTERFACE DIVIDED INTO MULTIPLE BANDWIDTH PARTS

(71) Applicant: Sony Corporation, Tokyo (JP)

(72) Inventors: Yassin Aden Awad, Basingstoke (GB); Shin Horng Wong, Basingstoke (GB); Kazuyuki Shimezawa, Basingstoke (GB); Vivek Sharma, Basingstoke (GB); Martin Warwick Beale, Basingstoke (GB)

(73) Assignee: SONY CORPORATION, Tokyo (JP)

(*) Notice: Subject to any disclaimer, the term of this patent is extended or adjusted under 35 U.S.C. 154(b) by 14 days.

(21) Appl. No.: 17/259,951

(22) PCT Filed: Jul. 18, 2019

(86) PCT No.: PCT/EP2019/069357
§ 371 (c)(1),
(2) Date: Jan. 13, 2021

(87) PCT Pub. No.: WO2020/020734
PCT Pub. Date: Jan. 30, 2020

(65) Prior Publication Data
US 2021/0281369 A1    Sep. 9, 2021

(30) Foreign Application Priority Data
Jul. 26, 2018   (EP) ..................................... 18185912

(51) Int. Cl.
*H04L 5/00* (2006.01)
(52) U.S. Cl.
CPC .......... *H04L 5/0005* (2013.01); *H04L 5/0042* (2013.01); *H04L 5/0098* (2013.01)

(58) Field of Classification Search
CPC ... H04L 5/0037; H04L 5/0039; H04L 5/0003; H04L 5/0005; H04L 5/0007;
(Continued)

(56) References Cited

U.S. PATENT DOCUMENTS

| | | |
|---|---|---|
| 2018/0049169 A1 | 2/2018 | Lin et al. |
| 2019/0090299 A1* | 3/2019 | Ang .................. H04W 28/20 |

(Continued)

FOREIGN PATENT DOCUMENTS

| | | |
|---|---|---|
| CN | 102461053 A | 5/2012 |
| WO | WO-2018093162 A1 | 5/2018 |

OTHER PUBLICATIONS

International Search Report and Written Opinion dated Dec. 12, 2019, received for PCT Application PCT/EP2019/069357, Filed on Jul. 18, 2019, 17 pages.

(Continued)

*Primary Examiner* — Peter Chen
(74) *Attorney, Agent, or Firm* — XSENSUS LLP

(57) ABSTRACT

Communications devices for communicating via a wireless access interface are provided. In one embodiment, a communications device comprises transceiver circuitry and controller circuitry configured in combination to receive signals using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface, to receive the signals via both of the at least two bandwidth parts, and to decode the signals received via each of the at least two bandwidth parts separately.

18 Claims, 6 Drawing Sheets

(58) Field of Classification Search
CPC ..... H04L 5/0053; H04L 5/001; H04L 5/0048;
H04L 5/0096; H04L 5/0098; H04L
5/0042; H04L 5/0058; H04L 5/0064;
H04L 5/0094; H04L 5/0023; H04L
5/0078; H04W 72/23; H04W 72/044;
H04W 72/0446; H04W 72/0453; H04W
74/006
See application file for complete search history.

(56) References Cited

U.S. PATENT DOCUMENTS

2019/0357238 A1* 11/2019 Zhou ................... H04L 5/0082
2020/0252180 A1* 8/2020 Takeda ................ H04W 72/042
2021/0076445 A1* 3/2021 Tsai ....................... H04L 5/003

OTHER PUBLICATIONS

Huawei et al., "On Bandwidth Part and Bandwidth Adaptation", 3GPP TSG RAN WG 1 Meeting #89, R1-1706900, May 15-19, 2017, 9 pages.
Huawei et al., "Overview of Bandwidth Part, CA, and DC Operation Including SRS Switching", 3GPP TSG RAN WG1 Meeting NR#3, R1-1715425, Sep. 18-21, 2017, 14 pages.

* cited by examiner

COMMUNICATIONS DEVICES, INFRASTRUCTURE EQUIPMENT AND METHODS FOR COMMUNICATING VIA AN ACCESS INTERFACE DIVIDED INTO MULTIPLE BANDWIDTH PARTS

CROSS-REFERENCE TO RELATED APPLICATIONS

The present application is based on PCT filing PCT/EP2019/069357, filed Jul. 18, 2019, which claims priority to EP 18185912.5, filed Jul. 26, 2018, the entire contents of each are incorporated herein by reference.

BACKGROUND

Field of Disclosure

The present disclosure relates to communications devices and methods of operating communications devices for communicating via a wireless access interface divided into multiple bandwidth parts, where more than one bandwidth part may be active for communications devices simultaneously.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

One embodiment of the present technique can provide a communications device for communicating via a wireless access interface, the communications device comprising transceiver circuitry and controller circuitry configured in combination to receive signals using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface, to receive the signals via both of the at least two bandwidth parts, and to decode the signals received via each of the at least two bandwidth parts separately.

Another embodiment of the present technique can provide a communications device for communicating via a wireless access interface, the wireless access interface comprising a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active, the communications device comprising transceiver circuitry and controller circuitry configured in combination to receive signals using the non-default bandwidth parts, to determine that one of the non-default bandwidth parts is deactivated, and to receive the signals via the others of the non-default bandwidth parts to the deactivated one of the non-default bandwidth parts in preference to receiving the signals from the default bandwidth part.

Yet another embodiment of the present technique can provide a communications device for communicating via a wireless access interface, the communications device comprising transceiver circuitry and controller circuitry configured in combination to transmit an indication of a capability of the communications device to receive or transmit using at least two of a plurality of bandwidth parts of the wireless access interface, each of the bandwidth parts being smaller than and within a carrier bandwidth of the wireless access interface.

Embodiments of the present technique, which further relate to infrastructure equipment, methods of operating communications devices and infrastructure equipment and circuitry for communications devices and infrastructure equipment, allow for the transmission and reception of signals by communications devices via multiple bandwidth parts in ways which allow for a reduction in power consumption at the communications devices.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1A:
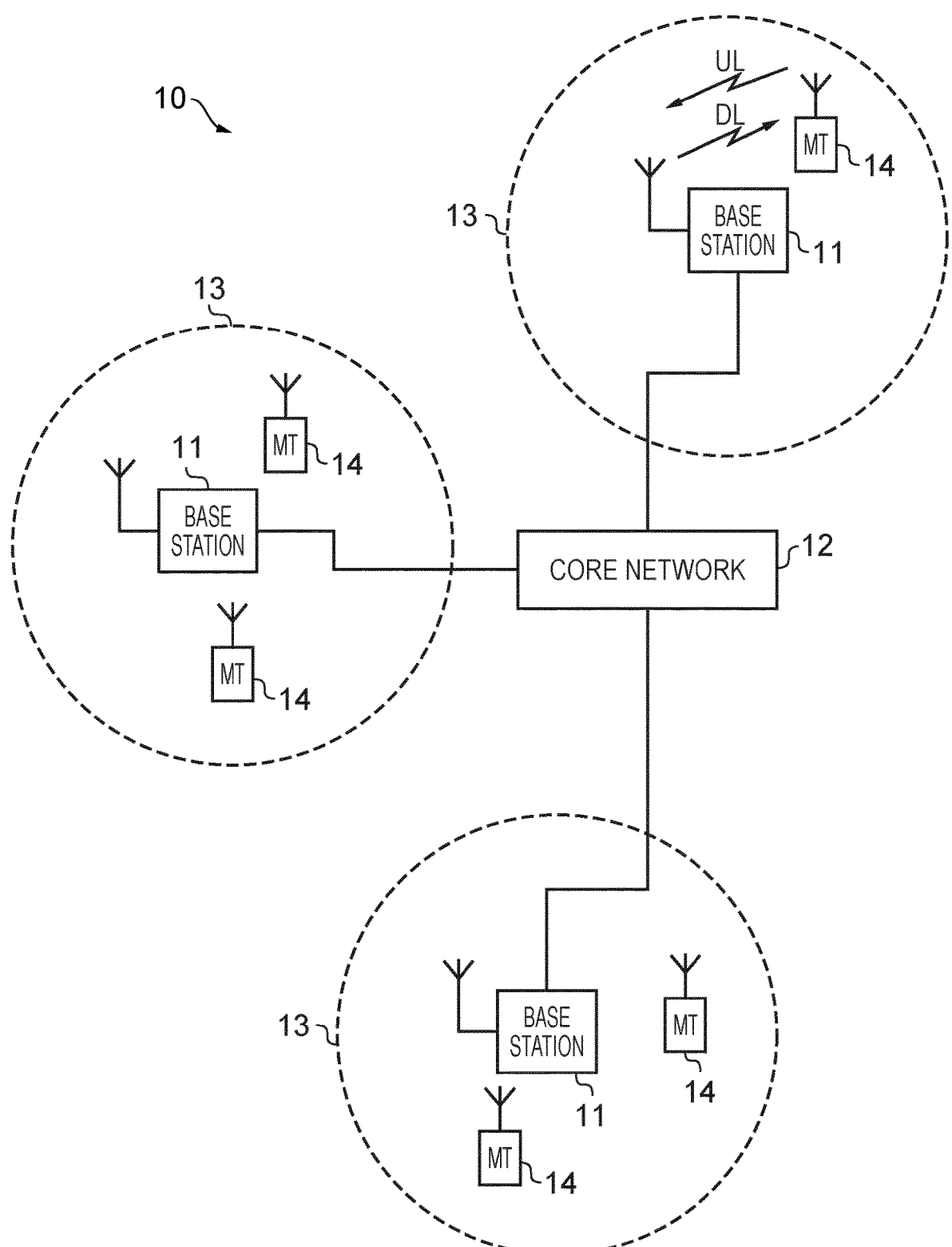
FIG. 1a schematically represents some aspects of an LTE-type wireless telecommunication system which may be configured to operate in accordance with certain embodiments of the present disclosure.

FIG. 1a provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1a and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [2]

eMBB services are characterised by high capacity with a requirement to support up to 20 Gb/s. The requirement for URLLC is a reliability of $1-10^{-5}$ (99.999%) for one transmission of a 32 byte packet with a user plane latency of 1 ms [3].

The elements of the wireless access network shown in FIG. 1a may be equally applied to a 5G new RAT configuration, except that a change in terminology may be applied as mentioned above.

Figure 1B:
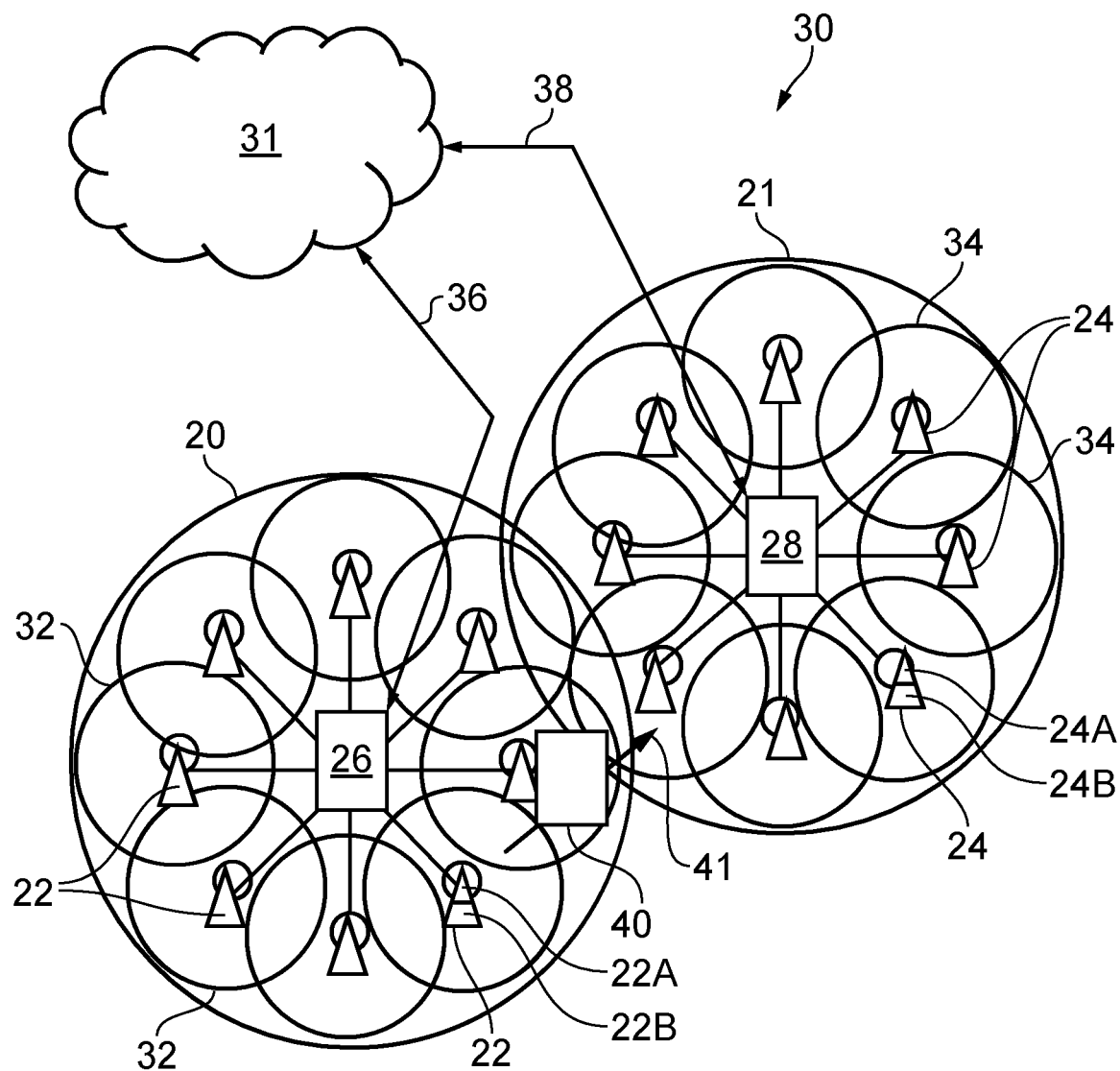
FIG. 1b schematically represents some aspects of a new radio access technology (RAT) wireless telecommunications system which may be configured to operate in accordance with certain embodiments of the present disclosure.

FIG. 1b is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 1b comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 1b may be broadly considered to correspond with the core network 12 represented in FIG. 1a, and the respective controlling nodes 26, 28 and their associated distributed units/TRPs 22, 24 may be broadly considered to provide functionality corresponding to base stations of FIG. 1a. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 1b within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 1b, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 1b represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1a and 1b.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1a which is adapted to provide functionality in accordance with the principles described herein, and in other examples the network infrastructure equipment may comprise a control unit/controlling node 26, 28 and/or a TRP 22, 24 of the kind shown in FIG. 1b which is adapted to provide functionality in accordance with the principles described herein.

Ultra Reliable Low Latency Communications (URLLC)

Ultra reliable low latency communications (URLLC) service, have recently been proposed within 3GPP for 4G and 5G communications networks. In some examples, URLLC communications are either low latency (where the user plane latency target, measured from the ingress of a layer 2 packet to its egress from the network, is 1 ms) or high reliability (where the acceptable error rate on URLLC transmissions is $10^{-5}$) or both low latency and high reliability (where both the latency and reliability targets need to be met at the same time).

Various techniques have been proposed in order to achieve the low latency and high reliability targets. Low latency can be achieved through one or more of the following techniques (which can be applied in combination):

- Short scheduling interval. Transmissions can be scheduled at frequent intervals. The scheduling interval may be less than the duration of a slot in the frame (e.g. when the slot duration is 1 ms, it may be possible to schedule URLLC every 0.1 ms, i.e. with a scheduling interval of 0.1 ms).
- Short TTI. The transmission time interval (TTI) of a URLLC transmission may consist of a small number of OFDM symbols (i.e. much smaller than the duration of a slot).
- On the fly decoding format. The format of the URLLC transmission may be designed to allow for "on the fly decoding". For example, reference symbols for channel estimation purposes may be located in the first OFDM symbol of the URLLC transmission and each OFDM symbol within the URLLC transmission can be decoded independently of other OFDM symbols (e.g. one OFDM symbol contains a whole forward error correction (FEC) codeword).

The short TTI referred to above can be termed a "mini-slot". The scheduling interval may also have an extent of a mini-slot.

High reliability can be achieved through one or more of the following techniques (which can be applied in combination):

- Frequency diverse transmissions: Transmission of the URLLC information over a wide bandwidth makes those transmissions resilient to frequency selective fading.
- Antenna diversity: Antenna diversity makes the URLLC transmission resilient to frequency selective fading on some of the channels between transmit and receive antennas.
- Robust coding and modulation: Use of powerful forward error correction codes and robust modulation formats increases the resilience of the URLLC transmission to noise.
- Hybrid ARQ: The URLLC transmission is protected with a cyclic redundancy check (CRC). If the CRC indicates that the URLLC packet is incorrect, the receiver can inform the transmitter of the error and the packet can be re-transmitted.
- Repetition: The URLLC transmission can be repeated, such that if an initial reception of the packet fails, a second reception of the packet can be combined with the first reception of the packet to increase the effective signal to noise ratio (SNR) of the received packet and allow decoding of the packet.
- Packet duplication: URLLC packets can be sent over two cells configured either as carrier aggregation (CA) or dual connectivity (DC). Packet duplication is performed in PDCP layer for both CA and DC.

The reliability aspect of URLLC is currently addressed through the use of LDPC codes, low coding rates (with low spectral efficiency), high aggregation levels for control channels and the support of multiple antennas at both the transmitter and receiver. Introduction of a new CQI table, having entries with low spectral efficiency, allows URLLC to operate in a spectrally efficient manner, where the scheduled modulation and coding scheme (MCS) can be chosen to meet the reliability criteria in the current channel conditions. In addition, for eMBB and URLLC multiplexing in the same slot in Rel-15, URLLC has a higher priority than eMBB due to stringent latency requirements. In this case, URLLC transmission can pre-empt an existing transmission of eMBB in the same slot.

Furthermore, Rel-15 supports multiple bandwidth parts (BWP) in a carrier bandwidth where these bandwidth parts could have different numerologies (such as subcarrier spacing, cyclic prefix (CP) length), however, only one BWP can be active at a given time for a UE.

Bandwidth Parts (BWP)

The wireless access interface may use carrier frequencies within a system bandwidth (also termed herein as a carrier bandwidth). The system bandwidth (which may be divided in a frequency division duplex scheme into an uplink portion and a downlink portion) may comprise one or more bandwidth parts (BWPs). These BWPs are formed through the grouping of a number of contiguous resource blocks (RBs). Conventionally, although multiple BWPs can exist within a carrier system bandwidth, where in Rel-15 up to four BWPs can be configured per UE semi-statically, at most one BWP may be activated at any given time in respect of a particular communications device.

For a given communications device, each BWP may be activated or de-activated independently of the others. However, a communications device may be limited in terms of the maximum number of BWPs which may be simultaneously activated. An activated BWP refers to a BWP which, for the communications device, may be used for the transmission or reception of data to or from the communications device. As such, an infrastructure equipment may schedule uplink or downlink transmissions for the communications device on any one of the BWPs which are currently active for the communications device. The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have differing bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions. Parameters of the wireless access interface which are applicable to a BWP (sub-carrier spacing, symbol and slot durations, cyclic prefix lengths) may be referred to collectively as the numerology of a BWP.

In Rel-15, through the use of BWPs, a communications device (in which Bandwidth Adaptation (BA) is employed to receive or transmit data as required) may reduce its power consumption by operating only using the range of carrier frequencies within the activated BWP, which may be considerably smaller than the system bandwidth. For power-constrained devices (such as those that are battery-powered, and particularly for those, such as machine type communications (MTC) devices, which may not be easily re-charged), such a reduction in power consumption may be of particular benefit.

Figure 2:
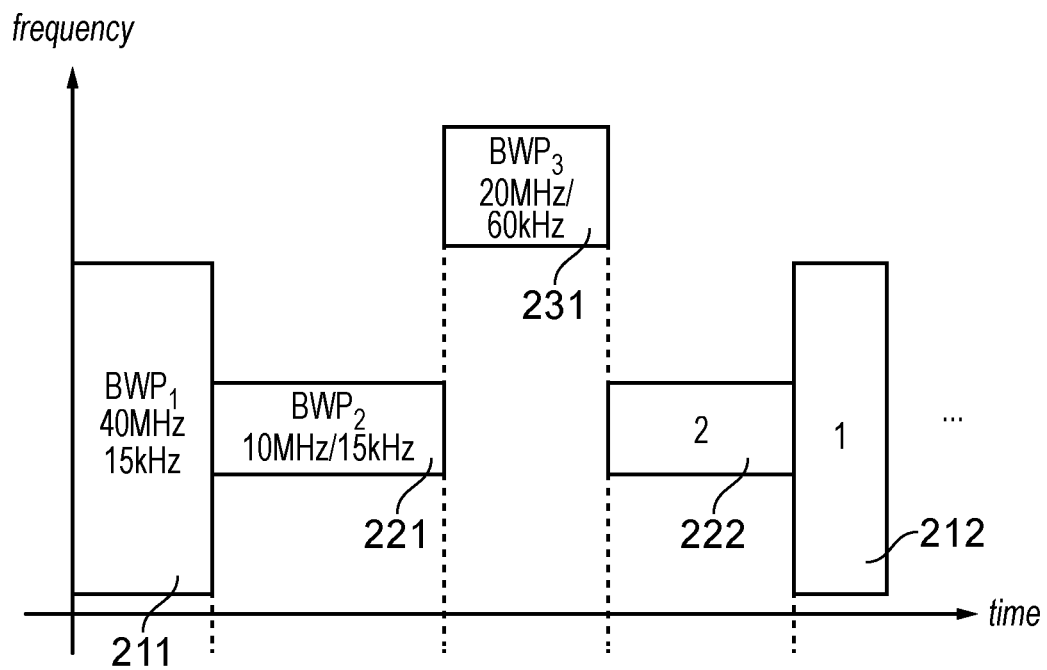
FIG. 2 illustrates an example of bandwidth adaptation, and is reproduced from [4]

When a UE has a large amount of data to receive and/or transmit, a wide pipe of bandwidth (i.e. a BWP having a larger bandwidth, covering more of the frequency resources of the wireless access interface) is opened (i.e. activated), while in the case of a small data transmission and/or reception (i.e. low activity or idle) a narrower BWP is activated. Before activation, a UE may have been configured in advance with a number of BWPs (up to 4) within a carrier system bandwidth. The characteristics of the BWPs, such as their numerologies, can be different on different BWPs to enable the system to handle different services efficiently (e.g. eMBB, URLLC). In Rel-15, only time division multiplexing (TDM) of BWPs is supported, as shown in FIG. 2. FIG. 2 shows how three BWPs (BWP1, BWP2 and BWP3) may be supported, but never simultaneously. To begin with, BWP1 is active 211. When BWP1 gets deactivated, BWP2 becomes active 221. This pattern then follows through with the activation of BWP3 231, before BWP2 222 and then BWP1 212 are activated again, individually, in turn.

In light of the differing numerologies which may be applicable to BWPs, a single activated BWP may not be suitable for the transmission of data associated with different services, if those different services have different requirements (e.g. latency requirements) or characteristics (e.g. bandwidth/data rate). Such services may include, for example, eMBB and URLLC, which may for example be configured with different subcarrier spacings (SCS) of 15 KHz and 60 KHz respectively. Therefore, consideration has been given to the possibility of activating multiple BWPs for a single communications device. However, no mechanism currently exists to permit the activation and/or deactivation of BWPs in a scenario where a communications device supports multiple activated BWPs in the same direction (i.e. uplink or downlink) simultaneously, and in particular where the communications device supports at most a predetermined number of activated BWPs per direction simultaneously.

Power Saving Techniques for Multiple Active BWPs in NR

Embodiments of the present technique allow for the support of frequency domain multiplexing (FDM) of different services, such as eMBB and URLLC, through the activation of multiple BWPs for a single communications device. In principle, it is necessary to simultaneously activate BWPs having different numerologies for this purpose, though in future use cases, if necessary, it is also possible to activate BWPs having the same numerology. When multiple BWPs are activated at the same time, it is envisioned that different realisations of the organisation of BWPs may be possible in order to reduce the power consumption at a UE.

Figure 3:
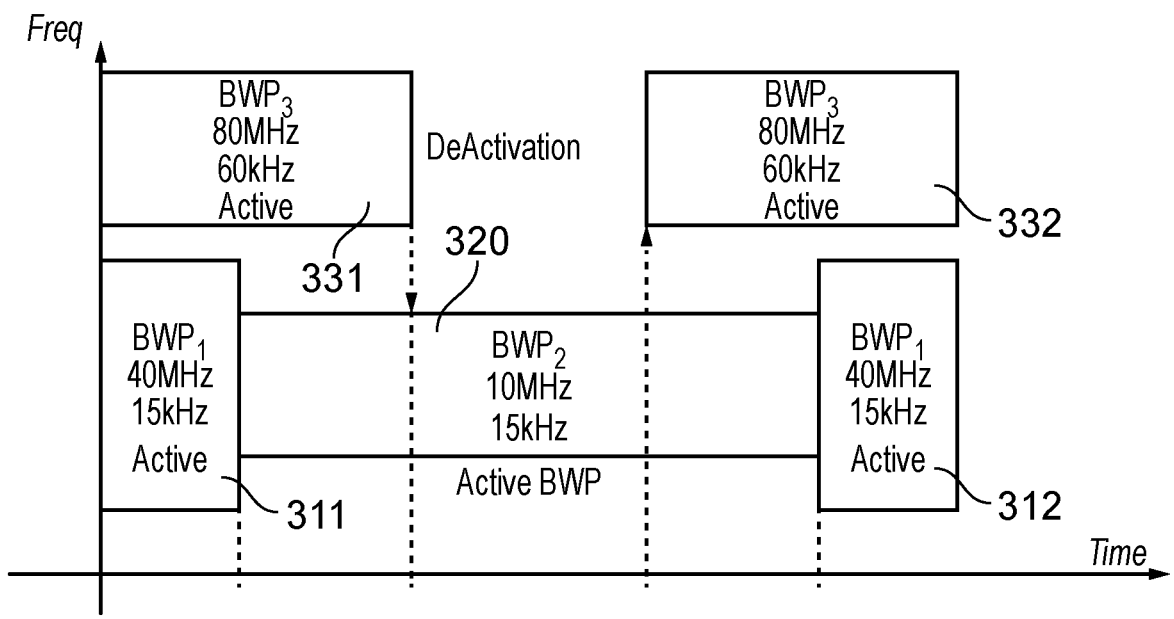
FIG. 3 illustrates an example of bandwidth adaptation where there are multiple active BWPs in accordance with embodiments of the present technique.

In future wireless telecommunications systems it is straightforward to extend the concept of bandwidth adaptation (BA) to multiple active BWPs, for example as shown in FIG. 3 where two or more BWPs are activated at a given time. In this scenario, a UE is configured to three BWPs, namely BWP1, BWP2 and BWP3, where BWP2 is chosen to be the default BWP 320. Initially, BWP1 311 and BWP3 331 are activated, for example, for receiving different services such as eMBB and URLLC respectively. As can be seen, when there is no activity on BWP1 311, the UE switches to default BWP2 320, i.e., after an inactivity timer expires. However, BWP3 331 still has an active data transmission to the UE. As time progresses, BWP3 331 also becomes inactive, hence, UE falls back to the default BWP 320 only. Later, BWP3 332 and then BWP1 312 may be activated again, and the default BWP2 320 deactivated. From a signaling perspective, in the example as shown in FIG. 3, BWP1 is associated with the default BWP (i.e. BWP2) by using RRC signaling and/or DCI signaling. BWP3 is separate with different numerology and can be activated as an additional BWP using also RRC signaling and/or DCI signaling.

Figure 4:
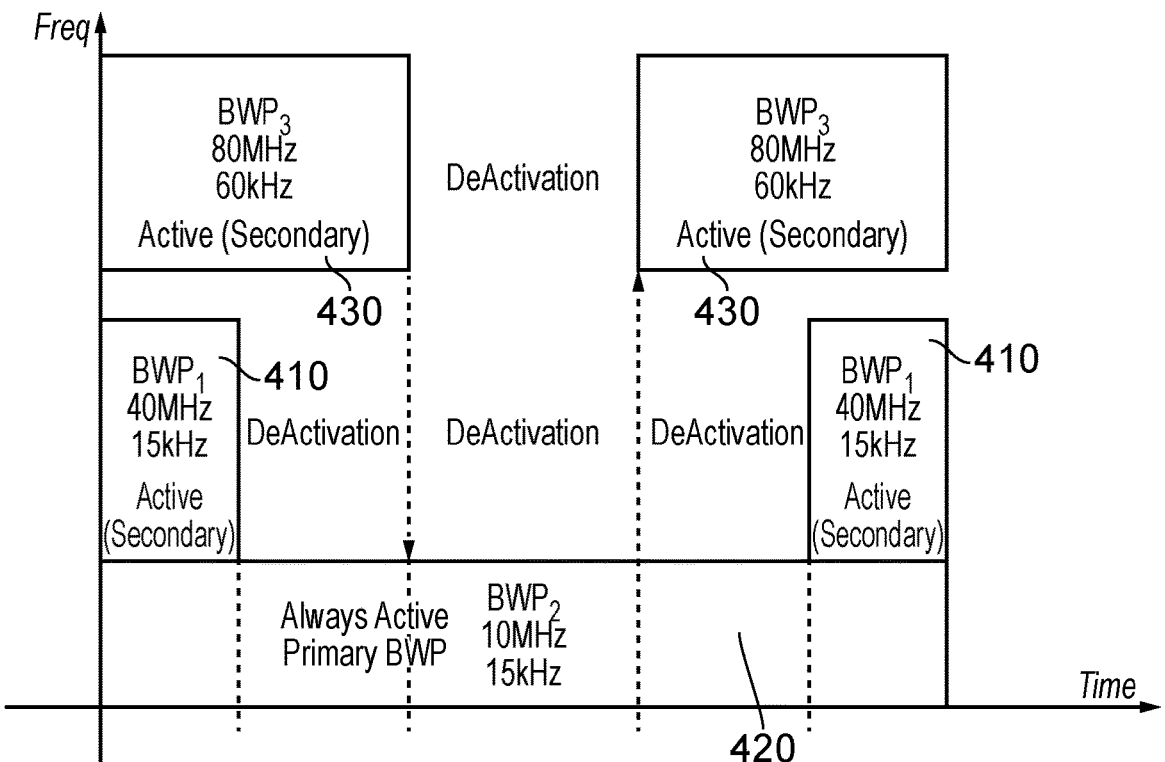
FIG. 4 shows the concept of having a primary BWP and secondary BWPs in a carrier system bandwidth in accordance with embodiments of the present technique.

Furthermore, in one way, it is possible to define one active BWP as always being a primary BWP and others as secondary BWPs in a serving cell, as shown in FIG. 4. The primary BWP 420 is always active, and the UE receives control and data transmissions on this primary active BWP 420 in addition to other secondary BWPs. From a power saving perspective, a secondary BWP is only activated when there is a high amount of data transmission or when a different service is available that requires a different numerology.

As can be seen in FIG. 4, it can be seen that BWP2 420 is always active even when BWP1 410 and BWP3 430 are active for receiving data transmissions. BWP1 410 and BWP3 430 are deactivated when inactivity timers expire, or are explicitly deactivated by the network via RRC or DCI signalling. BWP2 420, being the primary BWP, does not have an inactivity timer and can only be switched to a different BWP by the network (e.g. via RRC signalling). That is to say, the primary BWP does not have an inactivity timer whilst the secondary BWP(s) do have inactivity timers. Therefore, it is possible that a UE receives all common control information (i.e. common DCIs) on this primary BWP while some UE specific DCIs can be received on secondary BWPs in addition to the primary BWP.

Figure 5:
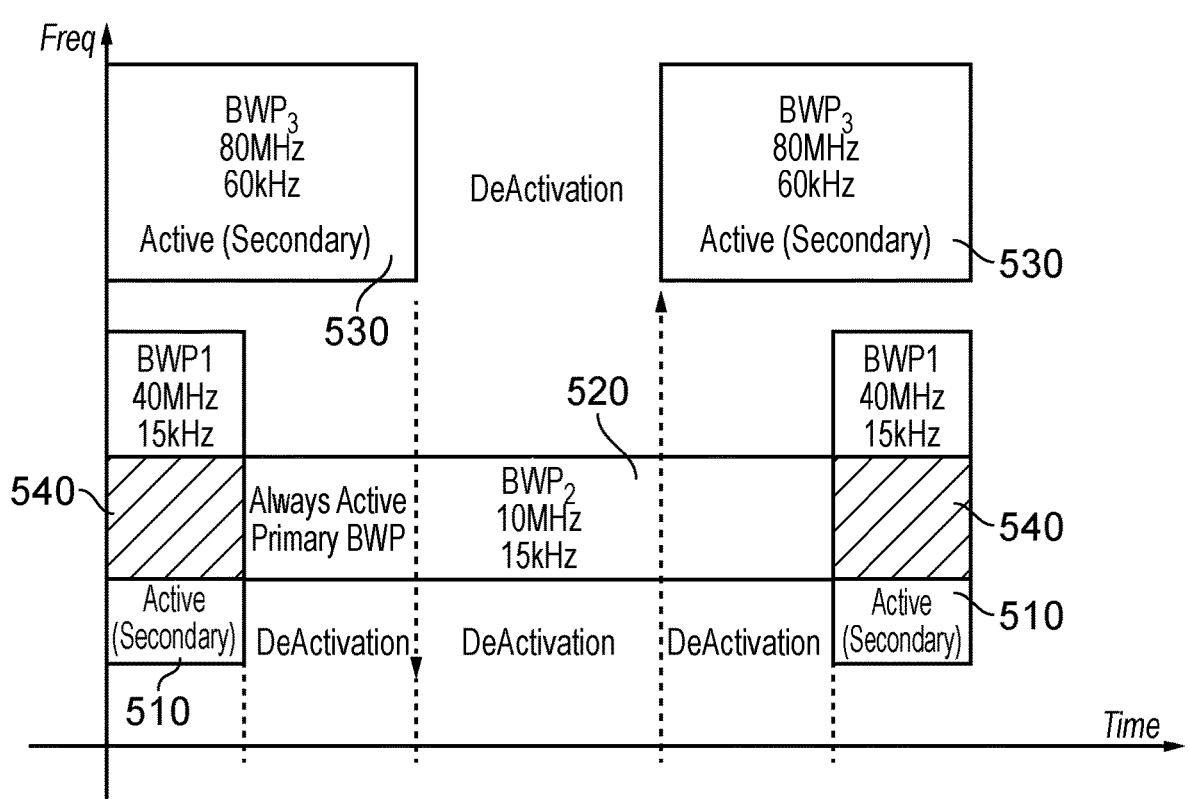
FIG. 5 shows an example of having a nested structure of a primary BWP and secondary BWPs in a carrier system bandwidth in accordance with a first embodiment of the present technique.

FIG. 5 shows an example of having a nested structure of a primary BWP 520 and secondary BWPs 510 in a carrier system bandwidth in accordance with a first embodiment of the present technique. According to this first embodiment, a communications device is provided for communicating with one or more infrastructure equipment of a wireless communications network via a wireless access interface. The communications device comprises transceiver circuitry and controller circuitry (which may be, for example, a microprocessor, a CPU, or a dedicated chipset, etc.) configured in combination to receive signals from one of the infrastructure equipment using at least two 510, 520 of a plurality of bandwidth parts 510, 520, 530 of the wireless access interface, each of the bandwidth parts 510, 520, 530 being smaller than and within a carrier bandwidth of the wireless access interface, wherein the at least two of the bandwidth parts 510, 520 at least partially overlap 540 in frequency resources of the carrier bandwidth and time resources of the wireless access interface, to receive the signals via both of the at least two bandwidth parts 510, 520, and to decode the signals received via each of the at least two bandwidth parts 510, 520 separately.

Essentially, according to the first embodiment, for multiple active BWPs in NR, if a primary active BWP is nested with a secondary BWP where both have similar numerologies, a UE can receive both of these BWPs simultaneously. Alternatively, the UE may prioritise between the two active BWPs to receive one of them. In other words, the at least two bandwidth parts comprise a primary bandwidth part and at least one secondary bandwidth part. Here, either the controller circuitry is configured to select one of the primary and secondary bandwidth parts for receiving signals from or transmitting signals to the infrastructure equipment or the transceiver circuitry and controller circuitry are configured in combination to receive an indication from the infrastructure equipment of one of the primary and secondary bandwidth parts for receiving signals from or transmitting signals to the infrastructure equipment. Only the at least one secondary bandwidth part has an inactivity timer associated with it, as described above in relation to FIG. 4. It should be appreciated by those skilled in the art that some embodiments of the present technique may comprise a primary BWP with no inactivity timer and one or more secondary BWPs which each have inactivity timers, where none of the BWPs are nested as shown in FIG. 5.

In general, it may be possible that the primary BWP overlaps in frequency with other BWPs, and therefore the primary active BWP can be nested with a larger secondary BWP as shown in FIG. 5 (assuming both have similar numerologies) so that UE can receive them simultaneously during overlapped transmission in the same baseband processing (BWP1 510 overlaps with BWP2 520 in the shaded portion 540).

In addition, for the nested structure as shown in FIG. 5:
 a) A UE can process each BWP separately in the baseband. That is, the UE can decode each control channel separately at the UE, and the gNodeB schedules on the time and frequency resources in such a way that it avoids conflicts and collisions;
 b) Alternatively, a UE prioritises to receive all control information (including control information carried by smaller BWP) only from the larger BWP (either primary or secondary BWP), as this gives more throughput to the UE. In this case, if both BWPs have the same (or similar) numerology, the network can align the location and size of the CORESET (control resources) configuration of the larger BWP to that of the smaller BWP. This means that the two CORESETs are on top of each other, where all configuration parameters are exactly the same, such as time-domain and frequency-domain resources, interleaving shift ($h_{shift}$), DMRS sequence generation (including the subcarrier reference point or subcarrier 0 of the lowest-numbered common resource block in the CORESET) so that a UE can see only one CORESET configuration. This is useful for receiving some common control information inside the larger BWP that is usually transmitted in the smaller initial BWP, such as the system information and paging. In other words, the at least two bandwidth parts comprise a primary bandwidth part and at least one secondary bandwidth part, the primary bandwidth part and the at least one secondary bandwidth part having a same numerology (i.e. where the numerology is one or more of sub-carrier spacing, symbol and slot durations and cyclic prefix lengths), and the transceiver circuitry and controller circuitry are configured in combination to decode signals (e.g. system information and/or paging) received via a larger one of the at least two bandwidth parts, the signals being located on the overlapped frequency resources of a smaller one of the at least two bandwidth parts and the larger of the bandwidth parts; or
 c) Alternatively, a UE receives only the primary BWP as it may carry some critical common information (e.g. system information, a random access response (RAR), or power control related information).

Figure 6:
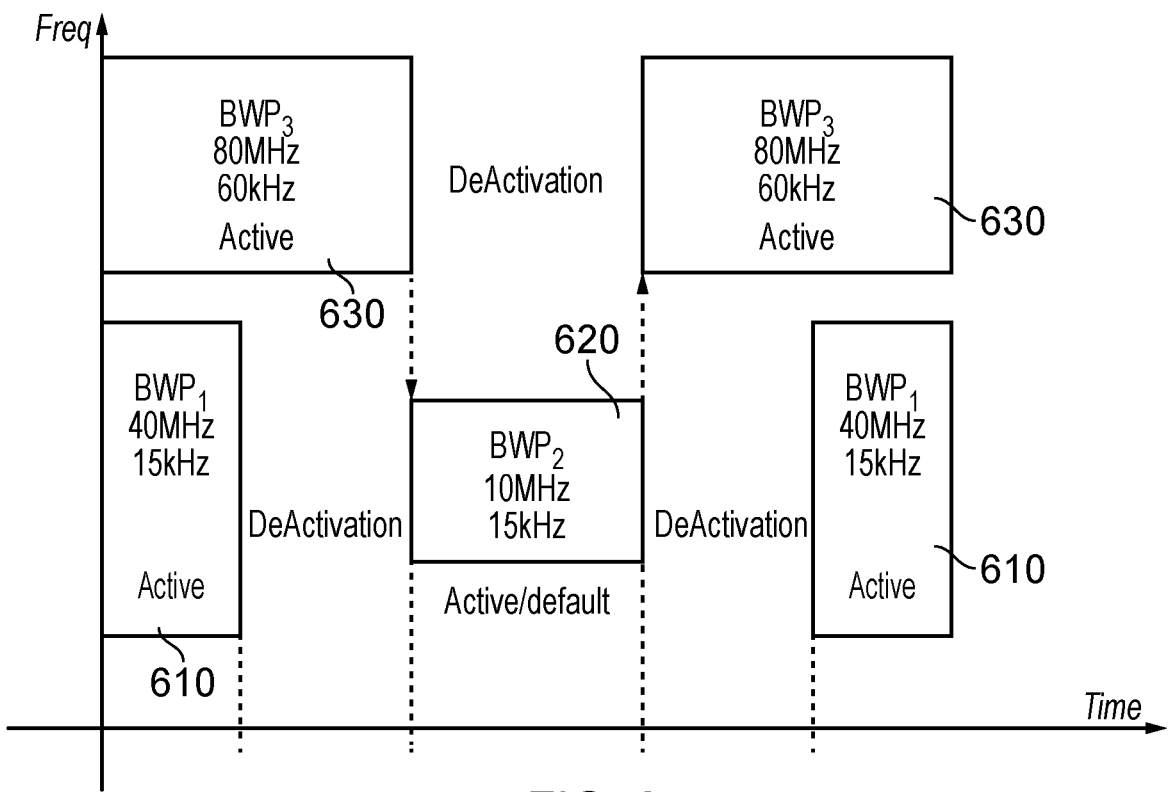
FIG. 6 shows an example of a UE moving between active BWPs in accordance with a second embodiment of the present technique.

FIG. 6 shows an example of a UE moving between active BWPs in accordance with a second embodiment of the present technique using the concept of default BWP and non-default BWP(s). According to this second embodiment, there is communications device for communicating with one or more infrastructure equipment of a wireless communications network via a wireless access interface, the wireless access interface comprising a plurality of bandwidth parts 610, 620, 630, each of the bandwidth parts 610, 620, 630 being smaller than and within a carrier bandwidth of the wireless access interface, the plurality of bandwidth parts comprising a default bandwidth part 620 and at least two non-default bandwidth parts 610, 630 which are not always active. The communications device comprises transceiver circuitry and controller circuitry (which may be, for example, a microprocessor, a CPU, or a dedicated chipset, etc.) configured in combination to receive signals from one of the infrastructure equipment using the non-default 610, 630 bandwidth parts, to determine that one of the non-default bandwidth parts 610 is deactivated, and to receive the signals via the others 630 of the non-default bandwidth parts to the deactivated one 610 of the non-default bandwidth parts in preference to receiving the signals from the default bandwidth part 620.

Essentially, according to the second embodiment, for multiple active BWPs in NR, when an active BWP is deactivated by either the expiry of an inactivity timer, or DCI or RRC signalling, and if at least another non-default BWP is active, a UE does not move to a default BWP in order to avoid wasting power by operating with the default BWP at the same time as the other non-default BWP.

As described above, when a BWP is deactivated, the UE may fall back to a default BWP even if another BWP is active. This can be enhanced in such a way, according to the second embodiment described above by way of FIG. 6, that when an active BWP expires (becomes deactivated) and if another BWP is active, the UE does not move to a default BWP and hence does not waste power operating on two active BWPs at the same time. Generally speaking, the difference between a primary BWP and a default BWP is that a primary BWP is never deactivated while a default BWP can be deactivated by some criteria. A default BWP is typically narrower than the non-default BWPs, so as to allow for power consumption reduction at a UE if the UE falls back to it when there is no data associated with services for which the higher bandwidth non-default BWPs are used.

This is illustrated in FIG. 6 as described above where a UE is configured to three BWPs 610, 620, 630, from which BWP2 620 is chosen to be the default BWP. Initially BWP1 610 and BWP3 630 are activated, for example, for receiving different services such as eMBB for BWP1 610 and URLLC for BWP3 630. When there is no activity on BWP1 610, BWP3 630 still has a data transmission to the UE, so in this case BWP1 610 should be deactivated (the UE determines this based on an inactivity timer associated with BWP1 expiring or from RRC/DCI signalling received from the network) and the UE should continue to receive data on BWP3 630. As a result, power saving is achieved by not falling back to the default BWP2 620 when BWP1 610 is deactivated as long as BWP3 630 is still active.

Subsequently, when there is no data transmission on BWP3 630 and the timer expires, the UE then switches to the default BWP2 620 (it should be noted that by this time all timers for all secondary BWPs 610, 630 have expired). That is to say, the default BWP 620 is only activated when all other active BWPs 610, 630 are deactivated, e.g., due to the expiry of inactivity timers or through DCI or RRC signalling. Thus, if the inactivity timers for all non-default and active BWPs expire, the UE performs BWP switching to the default BWP. In other words, the transceiver circuitry and controller circuitry are configured in combination to determine that all of the non-default bandwidth parts are deactivated, and to receive the signals via the default bandwidth part.

According to a third embodiment, a UE may indicate to the network/gNodeB through the transmission of signalling information that it is capable of receiving and transmitting multiple active BWPs. According to this third embodiment, a communications device is provided for communicating with one or more infrastructure equipment of a wireless communications network via a wireless access interface. The communications device comprises transceiver circuitry and controller circuitry (which may be, for example, a microprocessor, a CPU, or a dedicated chipset, etc.) configured in combination to transmit to one of the infrastructure equipment an indication of a capability of the communications device to receive signals from or transmit signals to the infrastructure equipment using at least two of a plurality of bandwidth parts of the wireless access interface, each of the bandwidth parts being smaller than and within a carrier bandwidth of the wireless access interface.

In order for the network to be able to configure and activate multiple BWPs for a UE, the UE should indicate whether it is capable of receiving and transmitting multiple BWPs to the network or gNB. The capability can be indicated in separate signalling or in combination with other UE features. In addition, the UE can indicate the maximum number of the simultaneously active BWPs and configurable BWPs in the UE capability. The maximum number of the simultaneously active BWPs should be less than or equal to the maximum number of configurable BWPs. In other words, the indication of the capability of the communications device to receive signals from or transmit signals to the infrastructure equipment using the at least two bandwidth parts comprises at least one of a first number indicating a maximum number of the bandwidth parts that the communications device is capable of simultaneously using to receive signals from or transmit signals to the infrastructure equipment and a second number indicating a maximum number of the bandwidth parts that can be configured for use by the communications device for receiving signals from or transmitting signals to the infrastructure equipment, the second number being greater than or equal to the first number.

It should be appreciated by those skilled in the art that a communications device may operate in accordance with any one, two or all of the above described three embodiments of the present technique. For example, a communications device may receive multiple nested BWPs from the network simultaneously after having indicated to the network that it is capable of doing so, and/or the communications device may avoid switching to a default BWP where possible when there are active non-default BWPs.

Flow Chart Representation

Figure 7:
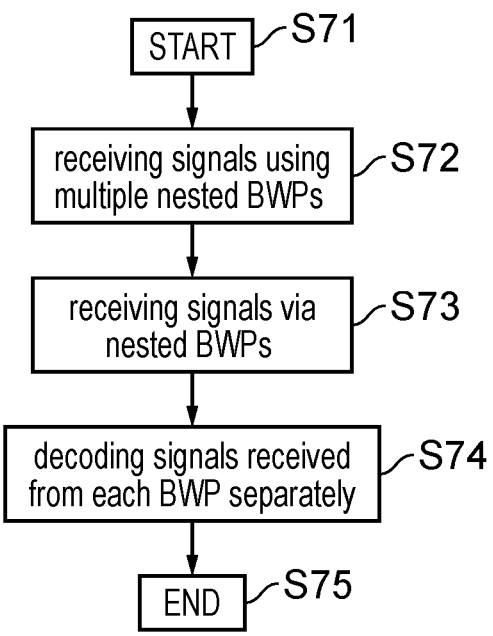
FIG. 7 is a flow diagram representation of a method of operating a communications device according to the first embodiment of the present technique.

FIG. 7 shows a flow diagram illustrating a method of operating a communications device for communicating with one or more infrastructure equipment of a wireless communications network via a wireless access interface according to the first embodiment of the present technique.

The method begins in step S71. The method comprises, in step S72, receiving signals from one of the infrastructure equipment using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface. In step S73, the process comprises receiving the signals via both of the at least two bandwidth parts. The method then advances to step S74, which comprises decoding the signals received via each of the at least two bandwidth parts separately. The process ends in step S75.

Figure 8:
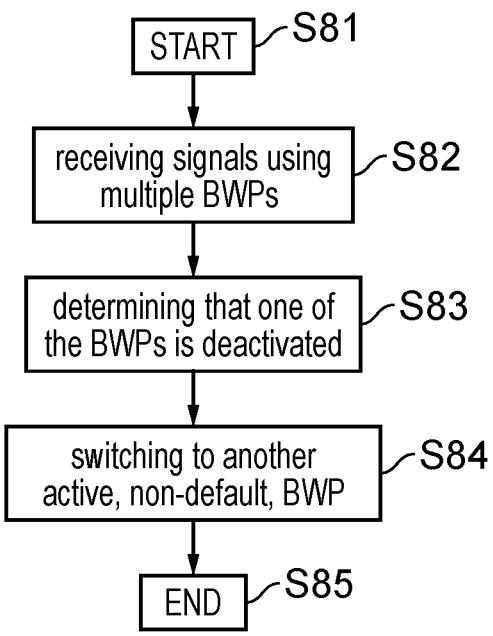
FIG. 8 is a flow diagram representation of a method of operating a communications device according to the second embodiment of the present technique.

FIG. 8 shows a flow diagram illustrating a method of operating a communications device for communicating with one or more infrastructure equipment of a wireless communications network via a wireless access interface according to the second embodiment of the present technique. The wireless access interface comprises a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active.

The method begins in step S81. The method comprises, in step S82, receiving signals from one of the infrastructure equipment using the non-default bandwidth parts. In step S83, the process comprises determining that one of the non-default bandwidth parts is deactivated. The method then advances to step S84, which comprises receiving the signals via the others of the non-default bandwidth parts to the deactivated one of the non-default bandwidth parts in preference to receiving the signals from the default bandwidth part. The process ends in step S85.

Figure 9:
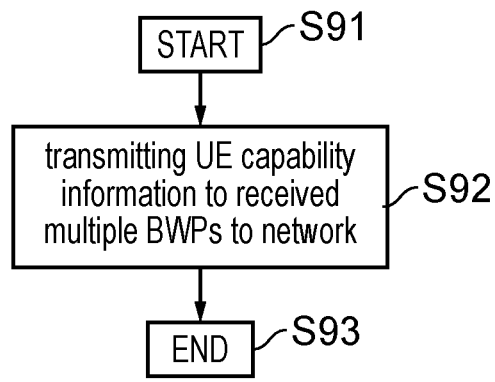
FIG. 9 is a flow diagram representation of a method of operating a communications device according to a third embodiment of the present technique.

FIG. 9 shows a flow diagram illustrating a method of operating a communications device for communicating with one or more infrastructure equipment of a wireless communications network via a wireless access interface according to the third embodiment of the present technique.

The method begins in step S91. The method comprises, in step S92, transmitting to one of the infrastructure equipment an indication of a capability of the communications device to receive signals from or transmit signals to the infrastructure equipment using at least two of a plurality of bandwidth parts of the wireless access interface, each of the bandwidth parts being smaller than and within a carrier bandwidth of the wireless access interface. The process ends in step S93.

Those skilled in the art would appreciate that the methods shown by any of FIGS. 7 to 9 may be adapted in accordance with embodiments of the present technique. For example, other intermediate steps may be included in the method, or the steps may be performed in any logical order. Furthermore, as described above, it should be appreciated by those skilled in the art that a communications device may operate in accordance with any one, two or all of the above described methods as described by way of FIGS. 7 to 9.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

Thus there have been described communications devices for communicating with one or more infrastructure equipment of a wireless communications network via a wireless access interface. In one embodiment, a communications device comprises transceiver circuitry and controller circuitry configured in combination to receive signals from one of the infrastructure equipment using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface, to receive the signals via both of the at least two bandwidth parts, and to decode the signals received via each of the at least two bandwidth parts separately. In another embodiment, the wireless access interface comprises a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active, and a communications device comprising transceiver circuitry and controller circuitry configured in combination to receive signals from one of the infrastructure equipment using the non-default bandwidth parts, to determine that one of the non-default bandwidth parts is deactivated, and to receive the signals via the others of the non-default bandwidth parts to the deactivated one of the non-default bandwidth parts in preference to receiving the signals from the default bandwidth part. In yet another embodiment, a communications device comprises transceiver circuitry and controller circuitry configured in combination to transmit to one of the infrastructure equipment an indication of a capability of the communications device to receive signals from or transmit signals to the infrastructure equipment using at least two of a plurality of bandwidth parts of the wireless access interface, each of the bandwidth parts being smaller than and within a carrier bandwidth of the wireless access interface.

The following numbered paragraphs provide further example aspects and features of the present technique:

Paragraph 1. A communications device for communicating via a wireless access interface, the communications device comprising transceiver circuitry and controller circuitry configured in combination
  to receive signals using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface,
  to receive the signals via both of the at least two bandwidth parts, and
  to decode the signals received via each of the at least two bandwidth parts separately.

Paragraph 2. A communications device according to Paragraph 1, wherein the at least two bandwidth parts comprise a primary bandwidth part and at least one secondary bandwidth part, and the controller circuitry is configured to select one of the primary and secondary bandwidth parts for receiving or transmitting signals.

Paragraph 3. A communications device according to Paragraph 1 or Paragraph, wherein the at least two bandwidth parts comprise a primary bandwidth part and at least one secondary bandwidth part, and the transceiver circuitry and controller circuitry are configured in combination to receive an indication of one of the primary and secondary bandwidth parts for receiving or transmitting signals.

Paragraph 4. A communications device according to any of Paragraphs 1 to 3, wherein the at least two bandwidth parts comprise a primary bandwidth part and at least one secondary bandwidth part, wherein only the at least one secondary bandwidth part has an inactivity timer associated with it.

Paragraph 5. A communications device according to any of Paragraphs 1 to 4, wherein the at least two bandwidth parts comprise a primary bandwidth part and at least one secondary bandwidth part, the primary bandwidth part and the at least one secondary bandwidth part having a same numerology, and the transceiver circuitry and controller circuitry are configured in combination to decode signals received via a larger one of the at least two bandwidth parts, the signals being located on the overlapped frequency resources of a smaller one of the at least two bandwidth parts and the larger of the bandwidth parts.

Paragraph 6. A communications device according to any of Paragraphs 1 to 5, where the signals are received via both of the at least two bandwidth parts simultaneously.

Paragraph 7. A communications device for communicating via a wireless access interface, the wireless access interface comprising a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active, the communications device comprising transceiver circuitry and controller circuitry configured in combination
  to receive signals using the non-default bandwidth parts,
  to determine that one of the non-default bandwidth parts is deactivated, and
  to receive the signals via the others of the non-default bandwidth parts to the deactivated one of the non-default bandwidth parts in preference to receiving the signals from the default bandwidth part.

Paragraph 8. A communications device according to Paragraph 7, wherein the transceiver circuitry and controller circuitry are configured in combination
  to determine that all of the non-default bandwidth parts are deactivated, and
  to receive the signals via the default bandwidth part.

Paragraph 9. A communications device according to Paragraph 7 or Paragraph 8, wherein the determination is made based on the expiry of one or more inactivity timers each associated with one of the non-default bandwidth parts.

Paragraph 10. A communications device according to any of Paragraphs 7 to 9, wherein the determination is made based on receiving Radio Resource Control, RRC, signalling.

Paragraph 11. A communications device according to any of Paragraphs 7 to 10, wherein the determination is made based on receiving Downlink Control Information, DCI, signalling.

Paragraph 12. A communications device according to any of Paragraphs 7 to 11, wherein the determination is made based on receiving Medium Access Control, MAC, Control Entity, MAC-CE, signalling.

Paragraph 13. A communications device according to any of Paragraphs 7 to 12, wherein at least two of the bandwidth parts at least partially overlap in frequency resources of the carrier bandwidth and time resources of the wireless access interface, and the transceiver circuitry and controller circuitry are configured in combination
  to receive the signals via both of the at least two bandwidth parts, and
  to decode the signals received via each of the at least two bandwidth parts separately.

Paragraph 14. A communications device according to Paragraph 13, wherein the at least two bandwidth parts comprise a primary bandwidth part and at least one secondary bandwidth part, and the controller circuitry is configured to select one of the primary and secondary bandwidth parts for receiving or transmitting signals.

Paragraph 15. A communications device according to Paragraph 13 or Paragraph 14, wherein the at least two bandwidth parts comprise a primary bandwidth part and at least one secondary bandwidth part, and the transceiver circuitry and controller circuitry are configured in combination to receive an indication of one of the primary and secondary bandwidth parts for receiving or transmitting signals.

Paragraph 16. A communications device according to any of Paragraphs 13 to 15, wherein the at least two bandwidth parts comprise a primary bandwidth part and at least one secondary bandwidth part, wherein only the at least one secondary bandwidth part has an inactivity timer associated with it.

Paragraph 17. A communications device according to any of Paragraphs 13 to 16, wherein the at least two bandwidth parts comprise a primary bandwidth part and at least one secondary bandwidth part, the primary bandwidth part and the at least one secondary bandwidth part having a same numerology, and the transceiver circuitry and controller circuitry are configured in combination to decode signals received via a larger one of the at least two bandwidth parts, the signals being located on the overlapped frequency resources of a smaller one of the at least two bandwidth parts and the larger of the bandwidth parts.

Paragraph 18. A communications device according to any of Paragraphs 13 to 17, where the signals are received via both of the at least two bandwidth parts simultaneously.

Paragraph 19. A communications device according to any of Paragraphs 7 to 18, wherein the transceiver circuitry and controller circuitry are configured in combination
  to transmit, in advance of receiving the signals using at least two of the bandwidth parts, an indication of a capability of the communications device to receive or transmit signals using the at least two bandwidth parts.

Paragraph 20. A communications device according to Paragraph 19, wherein the indication of the capability of the communications device to receive or transmit signals using the at least two bandwidth parts comprises at least one of a first number indicating a maximum number of the bandwidth parts that the communications device is capable of simultaneously using to receive or transmit signals and second number indicating a maximum number of the bandwidth parts that can be configured for use by the communications device for receiving or transmitting signals, the second number being greater than or equal to the first number.

Paragraph 21. A communications device for communicating via a wireless access interface, the communications device comprising transceiver circuitry and controller circuitry configured in combination
  to transmit an indication of a capability of the communications device to receive or transmit signals using at least two of a plurality of bandwidth parts of the wireless access interface, each of the bandwidth parts being smaller than and within a carrier bandwidth of the wireless access interface.

Paragraph 22. A communications device according to Paragraph 21, wherein the indication of the capability of the communications device to receive or transmit signals using the at least two bandwidth parts comprises at least one of a first number indicating a maximum number of the bandwidth parts that the communications device is capable of simultaneously using to receive or transmit signals and second number indicating a maximum number of the bandwidth parts that can be configured for use by the communications device for receiving or transmitting signals, the second number being greater than or equal to the first number.

Paragraph 23. A method of operating a communications device for communicating via a wireless access interface, the method comprising
  receiving signals using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface,
  receiving the signals via both of the at least two bandwidth parts, and
  decoding the signals received via each of the at least two bandwidth parts separately.

Paragraph 24. Circuitry for a communications device for communicating via a wireless access interface, the communications device comprising transceiver circuitry and controller circuitry configured in combination
  to receive signals using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface,
  to receive the signals via both of the at least two bandwidth parts, and
  to decode the signals received via each of the at least two bandwidth parts separately.

Paragraph 25. A method of a communications device for communicating via a wireless access interface, the wireless access interface comprising a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active, the method comprising
  receiving signals using the non-default bandwidth parts,
  determining that one of the non-default bandwidth parts is deactivated, and
  receiving the signals via the others of the non-default bandwidth parts to the deactivated one of the non-default bandwidth parts in preference to receiving the signals from the default bandwidth part.

Paragraph 26. Circuitry for a communications device for communicating via a wireless access interface, the wireless access interface comprising a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active, the communications device comprising transceiver circuitry and controller circuitry configured in combination
  to receive signals using the non-default bandwidth parts,
  to determine that one of the non-default bandwidth parts is deactivated, and
  to receive the signals via the others of the non-default bandwidth parts to the deactivated one of the non-default bandwidth parts in preference to receiving the signals from the default bandwidth part.

Paragraph 27. A method of operating a communications device for communicating via a wireless access interface, the method comprising
transmitting an indication of a capability of the communications device to receive or transmit signals using at least two of a plurality of bandwidth parts of the wireless access interface, each of the bandwidth parts being smaller than and within a carrier bandwidth of the wireless access interface.

Paragraph 28. Circuitry for a communications device for communicating via a wireless access interface, the communications device comprising transceiver circuitry and controller circuitry configured in combination
to transmit an indication of a capability of the communications device to receive or transmit signals using at least two of a plurality of bandwidth parts of the wireless access interface, each of the bandwidth parts being smaller than and within a carrier bandwidth of the wireless access interface.

Paragraph 29. An infrastructure equipment forming part of a wireless communications network for communicating with one or more communications devices via a wireless access interface, the infrastructure equipment comprising transceiver circuitry and controller circuitry configured in combination
to transmit signals to one of the communications devices using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface, and wherein the signals are separately decodable.

Paragraph 30. A method of operating an infrastructure equipment forming part of a wireless communications network for communicating with one or more communications devices via a wireless access interface, the method comprising
transmitting signals to one of the communications devices using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface, and wherein the signals are separately decodable.

Paragraph 31. Circuitry for an infrastructure equipment forming part of a wireless communications network for communicating with one or more communications devices via a wireless access interface, the infrastructure equipment comprising transceiver circuitry and controller circuitry configured in combination
to transmit signals to one of the communications devices using at least two of a plurality of bandwidth parts of the wireless access interface, each of the bandwidth parts being smaller than and within a carrier bandwidth of the wireless access interface, wherein the at least two of the bandwidth parts at least partially overlap in frequency resources of the carrier bandwidth and time resources of the wireless access interface, and wherein the signals are separately decodable.

Paragraph 32. An infrastructure equipment forming part of a wireless communications network for communicating with one or more communications devices via a wireless access interface, the wireless access interface comprising a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active, the infrastructure equipment comprising transceiver circuitry and controller circuitry configured in combination
to transmit signals to one of the communications devices using the non-default bandwidth parts,
to deactivate one of the non-default bandwidth parts, and
to transmit the signals via the others of the non-default bandwidth parts to the deactivated one of the non-default bandwidth parts in preference to transmitting the signals via the default bandwidth part.

Paragraph 33. A method of operating an infrastructure equipment forming part of a wireless communications network for communicating with one or more communications devices via a wireless access interface, the wireless access interface comprising a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active, the method comprising
transmitting signals to one of the communications devices using the non-default bandwidth parts,
deactivating one of the non-default bandwidth parts, and
transmitting the signals via the others of the non-default bandwidth parts to the deactivated one of the non-default bandwidth parts in preference to transmitting the signals via the default bandwidth part.

Paragraph 34. Circuitry for an infrastructure equipment forming part of a wireless communications network for communicating with one or more communications devices via a wireless access interface, the wireless access interface comprising a plurality of bandwidth parts, each of the bandwidth parts being smaller than and within a carrier bandwidth of the wireless access interface, the plurality of bandwidth parts comprising a default bandwidth part and at least two non-default bandwidth parts which are not always active, the infrastructure equipment comprising transceiver circuitry and controller circuitry configured in combination
to transmit signals to one of the communications devices using the non-default bandwidth parts,
to deactivate one of the non-default bandwidth parts, and
to transmit the signals via the others of the non-default bandwidth parts to the deactivated one of the non-default bandwidth parts in preference to transmitting the signals via the default bandwidth part.

Paragraph 35. An infrastructure equipment forming part of a wireless communications network for communicating with one or more communications devices via a wireless access interface, the infrastructure equipment comprising transceiver circuitry and controller circuitry configured in combination
to receive from one of the communications devices an indication of a capability of the communications device to receive signals from or transmit signals to the infrastructure equipment using at least two of a plurality of bandwidth parts of the wireless access interface, each of the bandwidth parts being smaller than and within a carrier bandwidth of the wireless access interface.

Paragraph 36. A method of operating an infrastructure equipment forming part of a wireless communications network for communicating with one or more communications devices via a wireless access interface, the method comprising receiving from one of the communications devices an indication of a capability of the communications device to receive signals from or transmit signals to the infrastructure equipment using at least two of a plurality of bandwidth parts of the wireless access interface, each of the bandwidth parts being smaller than and within a carrier bandwidth of the wireless access interface.

Paragraph 37. Circuitry for an infrastructure equipment forming part of a wireless communications network for communicating with one or more communications devices via a wireless access interface, the infrastructure equipment comprising transceiver circuitry and controller circuitry configured in combination to receive from one of the communications devices an indication of a capability of the communications device to receive signals from or transmit signals to the infrastructure equipment using at least two of a plurality of bandwidth parts of the wireless access interface, each of the bandwidth parts being smaller than and within a carrier bandwidth of the wireless access interface.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-172834, "Revised WID on New Radio Access Technology," NTT DOCOMO, RAN #78.

[3] TR 38.913, "Study on Scenarios and Requirements for Next Generation Access Technologies (Release 14)", 3rd Generation Partnership Project.

[4] TS 38.300, "NR; Overall Description; Stage-2 (Release 15)", 3rd Generation Partnership Project.

What is claimed is:

1. A communications device for communicating via a wireless access interface, the communications device comprising:

transceiver circuitry and controller circuitry configured in combination to receive signals using at least two of a plurality of bandwidth parts of the wireless access interface, each of the bandwidth parts of the plurality of bandwidth parts being smaller than and within a carrier bandwidth of the wireless access interface, wherein the at least two of the bandwidth parts of the plurality of bandwidth parts at least partially overlap in frequency resources of the carrier bandwidth and time resources of the wireless access interface, and one of the at least two bandwidth parts is nested within the other of the at least two of the bandwidth parts, to receive the signals simultaneously via both of the at least two bandwidth parts of the plurality of bandwidth parts, and to process each of the received bandwidth parts of the plurality of bandwidth parts separately to decode the signals received via each of the at least two bandwidth parts of the plurality of bandwidth parts separately, wherein the other of the at least two bandwidth parts is always active in the time resources of the wireless access interface within a first time, and all other bandwidth parts of the plurality of bandwidth parts have at least one deactivation period in the time resources of the wireless access interface within the first time.

2. The communications device according to claim 1, wherein the at least two bandwidth parts of the plurality of bandwidth parts comprise a primary bandwidth part and at least one secondary bandwidth part, and the controller circuitry is configured to select one of the primary and secondary bandwidth parts for receiving or transmitting signals.

3. The communications device according to claim 1, wherein the at least two bandwidth parts of the plurality of bandwidth parts comprise a primary bandwidth part and at least one secondary bandwidth part, and the transceiver circuitry and controller circuitry are configured in combination to receive an indication of one of the primary and secondary bandwidth parts for receiving or transmitting signals.

4. The communications device according to claim 1, wherein the at least two bandwidth parts of the plurality of bandwidth parts comprise a primary bandwidth part and at least one secondary bandwidth part, wherein only the at least one secondary bandwidth part has an inactivity timer associated therewith.

5. The communications device according to claim 1, wherein the at least two bandwidth parts of the plurality of bandwidth parts comprise a primary bandwidth part and at least one secondary bandwidth part, the primary bandwidth part and the at least one secondary bandwidth part having a same numerology, and the transceiver circuitry and controller circuitry are configured in combination to decode signals received via a larger one of the at least two bandwidth parts of the plurality of bandwidth parts, the signals being located on the overlapped frequency resources of a smaller one of the at least two bandwidth parts and the larger one of the at least two bandwidth parts of the plurality of bandwidth parts.

6. A communications device for communicating via a wireless access interface, the wireless access interface comprising:
a plurality of bandwidth parts, each of the bandwidth parts of the plurality of bandwidth parts being smaller than and within a carrier bandwidth of the wireless access interface, the plurality of bandwidth parts of the plurality of bandwidth parts comprising a default bandwidth part and at least two non-default bandwidth parts which are not always active, the communications device comprising transceiver circuitry and controller circuitry configured in combination
to receive signals using the at least two non-default bandwidth parts, the at least two non-default bandwidth parts at least partially overlapping in time resources of the wireless access interface, wherein at least a portion of one of the two non-default bandwidth parts is nested within the default bandwidth part,
to determine that a first non-default bandwidth part of the at least two non-default bandwidth parts is deactivated, and
to receive the signals via at least a second non-default bandwidth part of the non-default bandwidth parts in preference to receiving the signals from the default bandwidth part,
wherein the other of the at least two non-default bandwidth parts is always active in the time resources of the wireless access interface within a first time, and all other bandwidth parts of the plurality of bandwidth parts have at least one deactivation period in the time resources of the wireless access interface within the first time.

7. The communications device according to claim 6, wherein the transceiver circuitry and controller circuitry are configured in combination to determine that all of the at least two non-default bandwidth parts are deactivated, and to receive the signals via the default bandwidth part.

8. The communications device according to claim 6, wherein the determination is made based on the expiry of one or more inactivity timers each associated with one of the at least two non-default bandwidth parts.

9. The communications device according to claim 6, wherein the determination is made based on receiving Radio Resource Control, RRC, signalling.

10. The communications device according to claim 6, wherein the determination is made based on receiving Downlink Control Information, DCI, signalling.

11. The communications device according to claim 6, wherein the determination is made based on receiving Medium Access Control, MAC, Control Entity, MAC-CE, signalling.

12. The communications device according to claim 6, wherein the transceiver circuitry and controller circuitry are configured in combination
to receive the signals via both of the at least two non-default bandwidth parts of the plurality of bandwidth parts, and
to decode the signals received via each of the at least two non-default bandwidth parts of the plurality of bandwidth parts separately.

13. The communications device according to claim 12, wherein the at least two non-default bandwidth parts of the plurality of bandwidth parts comprise a primary bandwidth part and at least one secondary bandwidth part, and the controller circuitry is configured to select one of the primary and the at least one secondary bandwidth parts for receiving or transmitting signals.

14. The communications device according to claim 12, wherein the at least two non-default bandwidth parts of the plurality of bandwidth parts comprise a primary bandwidth part and at least one secondary bandwidth part, and the transceiver circuitry and controller circuitry are configured in combination to receive an indication of one of the primary and the at least one secondary bandwidth parts for receiving or transmitting signals.

15. The communications device according to claim 12, wherein the at least two non-default bandwidth parts of the plurality of bandwidth parts comprise a primary bandwidth part and at least one secondary bandwidth part, wherein only the at least one secondary bandwidth part has an inactivity timer associated therewith.

16. The communications device according to claim 12, wherein the at least two non-default bandwidth parts of the plurality of bandwidth parts comprise a primary bandwidth part and at least one secondary bandwidth part, the primary bandwidth part and the at least one secondary bandwidth part having a same numerology, and the transceiver circuitry and controller circuitry are configured in combination to decode signals received via a larger one of the at least two non-default bandwidth parts of the plurality of bandwidth parts, the signals being located on the overlapped frequency resources of a smaller one of the at least two non-default bandwidth parts and the larger one of the at least two non-default bandwidth parts of the plurality of bandwidth parts.

17. The communications device according to claim 12, where the signals are received via both of the at least two non-default bandwidth parts of the plurality of bandwidth parts simultaneously.

18. The communications device according to claim 6, wherein the transceiver circuitry and controller circuitry are configured in combination
to transmit, in advance of receiving the signals using the at least two non-default bandwidth parts of the plurality of bandwidth parts, an indication of a capability of the communications device to receive or transmit signals using the at least two non-default bandwidth parts of the plurality of bandwidth parts.

* * * * *